United States Patent [19]

Pagilagan

[11] 4,251,424
[45] Feb. 17, 1981

[54] PLASTICIZED NYLON 612 WITH IMPROVED ZINC CHLORIDE RESISTANCE

[75] Inventor: Rolando U. Pagilagan, Parkersburg, W. Va.

[73] Assignee: E. I. Du Pont de Nemours and Company, Wilmington, Del.

[21] Appl. No.: 71,195

[22] Filed: Aug. 30, 1979

[51] Int. Cl.³ .............................................. C08K 5/36
[52] U.S. Cl. .................................. 260/30.8 R; 525/84
[58] Field of Search ...................... 525/84; 260/30.8 R

[56] References Cited

U.S. PATENT DOCUMENTS

| | | | |
|---|---|---|---|
| 3,632,790 | 1/1972 | Naarmann et al. | 525/184 |
| 3,822,227 | 7/1974 | Hermann et al. | 525/184 |
| 3,884,882 | 5/1975 | Caywood, Jr. | 525/332 |
| 4,010,223 | 3/1977 | Caywood, Jr. | 525/285 |
| 4,173,556 | 11/1979 | Coron et al. | 260/30.8 R |

FOREIGN PATENT DOCUMENTS 1901552 8/1970 Fed. Rep. of Germany ........... 525/184

*Primary Examiner*—Joseph L. Schofer
*Assistant Examiner*—Peter F. Kulkosky

[57] ABSTRACT

A polymeric composition having improved zinc chloride resistance comprising nylon 612, plasticizer and an olefin polymer having sites which adhere to the nylon 612 resin.

6 Claims, No Drawings

PLASTICIZED NYLON 612 WITH IMPROVED ZINC CHLORIDE RESISTANCE

BACKGROUND OF THE INVENTION

Polyamides are used in a wide variety of industrial applications. Particularly important are automotive applications such as flexible tubing and cable jackets. These uses, however, require a flexibility that is not characteristic of the unmodified resin. Accordingly, the required flexibility is generally attained by adding plasticizers to the polyamide resin.

Automotive applications for polyamide resins also require resistance to chloride salts of the type used for de-icing roads or the chloride salts from sea water in coastal areas. Nylon 612 has been found to be particularly resistant to aqueous zinc chloride solution. However, the presence of plasticizers normally used for nylon 612, such as the sulfonamide plasticizers, adversely affects the resistance of the nylon resin to zinc chloride. A need therefore exists for a plasticized nylon resin with improved zinc chloride resistance.

SUMMARY OF THE INVENTION

The present invention provides a plasticized nylon 612 with improved resistance to zinc chloride.

Specifically, the instant invention provides a polyamide composition comprising (a) about from 45 to 88 weight percent nylon 612 having an inherent viscosity of at least about 0.7, (b) about from 2 to 35 weight percent sulfonamide plasticizer, and (c) about from 10 to 40 weight percent of at least one olefin polymer having a tensile modulus of about from 1.0 to 180,000 psi and comprising at least about 10 weight percent, based on the olefin polymer, of adduct of maleic anhydride or fumaric acid and (i) a homopolymer of ethylene or (ii) a copolymer of ethylene, at least one $C_3$–$C_6$ α-olefin, and at least one nonconjugated diene.

DETAILED DESCRIPTION OF THE INVENTION

The compositions of the present invention are a blend of nylon 612, a sulfonamide plasticizer and an olefin polymer having sites which adhere to the nylon 612 resin.

The nylon 612 resin forms the major component of the blend, and is otherwise designated as polyhexamethylene dodecanoamide, prepared by techniques well known in the art. The nylon 612 generally has an inherent viscosity of at least about 0.7 and preferably greater than 0.9. Maximum inherent viscosity is not critical, and will be determined by the polymer characteristics desired and the capabilities of processing equipment. The nylon 612 represents about from 45 to 88 weight percent of the total composition. When the nylon represents less than about 45 weight percent of the blend of nylon, plasticizer and olefin polymer, the tensile strength is reduced, and the melt exhibits poor drawability. When the nylon 612 represents greater than 88 weight percent of the blend, flexibility and zinc chloride resistance are adversely affected. Preferably the nylon 612 represents about from 50 to 75 weight percent of the polymer blend for a particularly desirable balance of blend characteristics.

The sulfonamide plasticizer represents about from 2 to 35 weight percent of the blend of nylon 612, plasticizer and olefin copolymer. Preferably, the plasticizer represents about 5 to 20 weight percent of the blend. A wide variety of sulfonamide plasticizers can be used in the instant invention including those conventionally used in a plasticization of nylon 612. Particularly preferred are n-butylbenzenesulfonamide; a mixture of n-ethyl ortho- and para- toluene sulfonamide; n-cyclohexyl p-toluenesulfonamide; and o,p-toluenesulfonamide.

In accordance with the present invention, it has been found that the incorporation of about from 10 to 40 weight percent, and preferably about from 10 to 25 weight percent, of certain olefin polymers results in marked improvement in the zinc chloride resistance of plasticized nylon 612. The olefin polymer can be a single polymer or blend of polymers. The olefin polymer should contain at least about 10 weight percent of an adduct of maleic anhydride or fumaric acid with either an ethylene homopolymer or a copolymer of ethylene, at least one $C_3$–$C_6$ α-olefin, and at least one nonconjugated diene. The adducts of ethylene, α-olefin and diene are particularly preferred in the present invention. The amount of maleic anhydride or fumaric acid used in the adduct can vary widely. However, the maleic anhydride or fumaric acid generally represents about from 0.2 to 10 weight percent of the adduct, and preferably about from 0.5 to 5.0 weight percent, calculated as maleic anhydride. The remainder of the olefin polymer can be selected from α-olefins having 1–10 carbon atoms. When the olefin polymer is present as a polymer blend, the adduct of maleic anhydride or fumaric acid should preferably comprise about from 10–50 weight percent and the α-olefin should preferably comprise about from 50–90 weight percent.

Such copolymer adducts can be prepared as described in Flexman U.S. Pat. No. 4,026,067 or Caywood U.S. Pat. No. 3,884,882 and U.S. Pat. No. 4,010,223. The adducts preferably have an inherent viscosity of at least 1.0 as measured on 0.1 g of adduct in 100 ml of perchloroethylene at 30° C. The $C_3$–$C_6$ α-olefin can be propylene, 1-butene, 1-pentene or 1-hexene, of which propylene is preferred. The nonconjugated dienes include linear aliphatic dienes of at least six carbon atoms which have one terminal double bond and one internal double bond, and cyclic dienes wherein one or both of the carbon-to-carbon double bonds are part of a carbocyclic ring. Of the linear dienes, copolymers of ethylene, propylene, and 1,4-hexadiene are especially preferred.

Cyclic dienes for adduct formation which can be used include alkylidene bicycloakenes, alkenyl bicycloalkenes, bicycloalkadienes, and alkenyl cycloalkenes. Representative of alkylidene bicycloalkenes are 5-alkylidene-2-norbornenes such as 5-ethylidene-2-norbornene and 5-methylene-2-norbornene. Representative of alkenyl bicycloalkenes are 5-alkenyl-2-norbornenes such as 5-(1'-propenyl)-2-norbornene, 5-(2'-butenyl)-2-norbornene, and 5-hexenyl-2-norbornene. Dicyclopentadiene and 5-ethyl2,5-norbornadiene are illustrative of bicycloalkadienes, and vinyl cyclohexene is representative of alkenyl cycloalkenes which can be selected as the diene monomer.

Other copolymers which can be used to form the adduct include branched tetrapolymers made from ethylene, at least one $C_3$ to $C_6$ α-monoolefin with propylene being preferred, at least one nonconjugated diene, defined above, and at least one nonconjugated diene such as 2,5-norbornadiene or 1,7-octadiene.

The adducts used in this invention can be prepared by any process which intimately mixes maleic anhydride or fumaric acid with the homopolymer or copolymer without appreciable generation of free radicals, and which concurrently or subsequently heats the mixture to a temperature at which thermal addition occurs. Selected temperatures will generally be at least 225° C. to obtain adduct formation at acceptable rates and less than about 350° C. to avoid any significant polymer breakdown. Preferred temperature ranges will vary with the particular polymer and can readily be determined by one skilled in the art.

Mixing of the anhydride and polymer can be by blending molten anhydride with polymer in an internal mixer or extruder, or by blending finely divided dry maleic anhydride with polymer on a well-ventilated rubber mill with concurrent or subsequent heating, such as in a hot press or mold. Temperatures necessary to achieve thermal grafting are sufficiently high to dehydrate the diacid, forming the anhydride in situ. Thus, diacid can be compounded with the polymer instead of the anhydride when such is desired.

Preferred copolymers of ethylene, propylene, and 1,4-hexadiene are very resistant to free radical formation under high shear stress conditions and are readily mixed on conventional bulk processing equipment without gel formation. Care must be exercised, however, in selecting the mixing conditions for copolymers derived from strained ring dienes such as ethylidene norbornene. Such copolymers will readily generate free radicals when sheared at low temperatures, and are preferably mixed with the anhydride at high temperature, such as above 90° C. to avoid appreciable gel formation.

Unreacted anhydride is conveniently removed from the adduct by extraction with water.

The compositions of the present invention are admixed in the indicated proportions and melt blended for intimate admixture. Preferably, the nylon 612 and olefin polymer or polymers are first mixed by tumbling in a drum. Thereafter, the blend of nylon 612 and olefin polymer are blended in a melt extruder and the desired plasticizer injected into the polymer melt. The melt blending typically can be conducted at a temperature above the melting point of the components and below the decomposition temperature. A temperature range of about 240° C. to 290° C. is preferred.

The compositions of the present invention provide a unique combination of properties that has heretofore been unavailable. Specifically, the nylon 612 resins, blended with plasticizer and the olefin polymer as defined, exhibit the flexibility required for tubing and cable jacketing while exhibiting outstanding resistance to the zinc chloride salts.

The present invention is further illustrated by the following specific examples, in which parts and percentages are by weight unless otherwise indicated.

In these examples, the nylon 612 and olefin polymers were mixed by tumbling in a drum. The mixture was then melt blended in a 53 millimeter Werner & Pfleiderer twin screw extruder at a temperature of between 260° and 290° C. Plasticizer was added to the melt. The resulting melt blend was quenched in water, cut into pellets, and sparged with nitrogen until cold to remove moisture.

The dried material was molded for testing into 5 inch by one-half inch by one-eight inch rectangular specimens using a screw injection molding machine. For each test, five molded specimens were bent around the surface of a mandrel having a diameter of one inch and secured in this position. The specimens were then immersed in 50 weight percent aqueous zinc chloride solution. The specimens were periodically inspected for formation of cracks which indicated failure of the specimen.

EXAMPLE 1

A mixture was melt blended in a twin screw extruder using 4.0 weight percent of a fumaric acid grafted ethylene/propylene/hexadiene terpolymer having a graft level of 1.75 percent, 25.0 weight percent polyethylene and 71.0 weight percent of nylon 612. N-butylbenzenesulfonamide plasticizer was injected into the melt by means of pump and an injection nozzle.

The final product contained 62.4 weight percent nylon 612, 3.5 weight percent of the anhydride grafted terpolymer, 22.0 weight percent of the polyethylene and 12.1 weight percent of n-butylbenzenesulfonamide.

Five specimens were tested for zinc chloride resistance. No cracks were observed on any of the specimens after 23 days immersion in the test solution and the test was then stopped.

EXAMPLE 2–10 AND COMPARATIVE EXAMPLES A-F

The general procedure of Example 1 was repeated, using the materials and to give the zinc chloride resistance indicated in the Table.

TABLE

| Ex. | Nylon | Wt % | Additive Weight Percent | Type | Weight Percent n-Butyl-benzene-sulfonamide Plasticizer | Length of Time in 50% ZnCl$_2$ Solution before Failure |
|---|---|---|---|---|---|---|
| 2 | 612 | 67.0 | 5.7 | A* | 5.6 | >27 days |
|   |     |     | 21.7 | B* |     |          |
| 3 | 612 | 61.9 | 3.5 | A  | 12.8 | >27 days |
|   |     |     | 21.8 | C* |     |          |
| 4 | 612 | 57.5 | 4.5 | A  | 24.4 | >31 days |
|   |     |     | 13.6 | B  |     |          |
| 5 | 612 | 56.0 | 3.0 | A  | 26.2 | >31 days |
|   |     |     | 14.8 | C  |     |          |
| A | 612 | 80.3 | —   |    | 19.7 | 2½ to 16 hrs |
| 6 | 612 | 63.4 | 3.3 | A  | 16.6 | >23 days |
|   |     |     | 16.7 | C  |     |          |
| 7 | 612 | 66.7 | 3.5 | A  | 12.2 | >23 days |
|   |     |     | 17.6 | C  |     |          |
| B | 610 | 61.8 | 4.9 | A  | 18.7 | <4½ hrs |
|   |     |     | 14.6 | B  |     |          |
| C | 610 | 82.8 | —   |    | 17.2 | <4½ hrs. |
| D | 610 | 62.8 | 3.3 | A  | 17.4 | <20 hrs |
|   |     |     | 16.5 | C  |     |          |
| E | 69  | 62.3 | 3.3 | A  | 18.0 | 2 hrs. |
|   |     |     | 16.4 | C  |     |          |
| 8 | 612 | 55.2 | 5.8 | D* | 27.4 | 27 days |
|   |     |     | 11.6 | B  |     |          |
| 9 | 612 | 55.7 | 4.4 | D  | 26.7 | 6–8 days |
|   |     |     | 13.2 | C  |     |          |
| 10| 612 | 57.2 | 19.1 | E* | 23.7 | 6–9 days |
| F | 66  | 63.7 | 3.6 | A  | 10.3 | <3 min. |
|   |     |     | 22.4 | B  |     |          |

*A = Fumaric acid grafted ethylene/propylene/hexadiene containing 1.75 ± 0.25 weight percent functionality as maleic anhydride.
B = Low density polyethylene
C = Ethylene/propylene/hexadiene terpolymer
D = Fumaric acid grafted ethylene/propylene/hexadiene terpolymer containing 1.0 weight percent functionality as maleic anhydride.
E = Ethylene/methacrylic acid copolymer with part of the acid present as zinc salt

I claim:

1. A polymeric composition comprising
   (a) about from 45 to 88 weight percent nylon 612 having an inherent viscosity of at least about 0.7,
   (b) about from 2 to 35 weight percent sulfonamide plasticizer, and
   (c) about from 10 to 40 weight percent of an olefin polymer having a tensile modulus of about from 1.0 to 180,000 psi and comprising at least about 10 weight percent based on the olefin polymer of adduct of maleic anhydride or fumaric acid and
      (i) a homopolymer of ethylene or
      (ii) a copolymer of ethylene, at least one $C_3$–$C_6$ α-olefin, and at least one nonconjugated diene.

2. A composition of claim 1 wherein the olefin polymer comprises at least about 10 weight percent of an adduct of maleic anhydride or fumaric acid and a copolymer of ethylene, at least one $C_3$–$C_6$ α-olefin, and at least one nonconjugated diene.

3. A composition of claim 1 wherein the nylon 612 comprises about from 50 to 75 weight percent, the sulfonamide comprises about from 5 to 20 weight percent and the olefin polymer comprises about from 10 to 25 weight percent.

4. A composition of claim 1 wherein the olefin polymer comprises about from 50 to 90 percent of a polymer or copolymer of at least one olefin having 1–10 carbon atoms and about from 10 to 50 percent of the adduct.

5. A composition of claim 4 wherein the olefin of 1–10 carbon atoms consists essentially of polyethylene.

6. A composition of claim 1 wherein the adduct comprises about from 0.2 to 10 weight percent maleic anhydride or fumaric acid, calculated as maleic anhydride.

* * * * *